US006660950B2

(12) United States Patent
Fonseca

(10) Patent No.: US 6,660,950 B2
(45) Date of Patent: Dec. 9, 2003

(54) DATA LINE SWITCH

(76) Inventor: Danilo E. Fonseca, 5101 Dvorak Cir., Frederick, CO (US) 80504

( * ) Notice: Subject to any disclaimer, the term of this patent is extended or adjusted under 35 U.S.C. 154(b) by 103 days.

(21) Appl. No.: 09/912,036

(22) Filed: Jul. 24, 2001

(65) Prior Publication Data

US 2003/0062252 A1 Apr. 3, 2003

(51) Int. Cl.$^7$ .............................................. H01R 13/62
(52) U.S. Cl. ............................... 200/51 R; 200/51.04; 200/51.11; 439/310
(58) Field of Search ........................... 200/51 R–51.11, 200/1 R, 17 R; 379/99, 198, 199, 441, 445, 451; 439/152, 159, 160, 296, 310, 344, 476.1, 500, 923

(56) References Cited

U.S. PATENT DOCUMENTS

| | | |
|---|---|---|
| 692,004 A | 1/1902 | Butte |
| 750,953 A | 2/1904 | Dunfee |
| 1,227,936 A | 5/1917 | Rodier |
| 2,688,734 A | 9/1954 | Welling ........................ 339/45 |
| 3,475,715 A | 10/1969 | Venaleck ..................... 339/45 |
| 3,699,284 A | * 10/1972 | Anderson ................ 200/51.04 |
| RE28,545 E | 9/1975 | Harris ....................... 339/45 R |
| 4,508,404 A | 4/1985 | Frawley .................... 339/45 M |
| 4,630,878 A | 12/1986 | Heine et al. .............. 339/75 M |
| 5,083,042 A | 1/1992 | Merchant ................... 307/149 |
| 5,266,040 A | 11/1993 | Merrill et al. .............. 439/159 |
| 5,448,630 A | 9/1995 | Barstow ...................... 379/199 |
| 5,586,900 A | * 12/1996 | Yagi et al. ................... 439/310 |
| 5,645,439 A | 7/1997 | Nugent, Jr. et al. ......... 439/159 |
| 5,661,786 A | 8/1997 | Horn ............................ 379/99 |
| 5,774,543 A | 6/1998 | Flowers ....................... 379/441 |
| 5,800,189 A | 9/1998 | Ahmed ........................ 439/159 |
| 5,818,931 A | 10/1998 | Movassaghi ................. 379/445 |
| 5,857,868 A | * 1/1999 | Findon et al. ............... 439/310 |
| 5,864,106 A | * 1/1999 | Hartwig et al. ............ 200/17 R |
| 5,938,767 A | 8/1999 | Horn ............................ 713/200 |
| 6,062,883 A | 5/2000 | Schreiber et al. ........... 439/159 |
| 6,167,612 B1 | 1/2001 | Cunliffe ....................... 29/747 |
| 6,315,585 B1 | * 11/2001 | Oka ............................ 439/157 |
| 6,480,005 B2 | * 11/2002 | Nagano et al. ............. 324/538 |

FOREIGN PATENT DOCUMENTS

| | | | | |
|---|---|---|---|---|
| CA | 2 310 538 | 12/2001 | ........... | H04L/29/02 |
| CA | 2 350 014 | 12/2001 | ........... | H04L/29/02 |

* cited by examiner

*Primary Examiner*—Michael Friedhofer
(74) *Attorney, Agent, or Firm*—Emery L. Tracy

(57) ABSTRACT

A switch box (named a security switch) comprises a housing with a manually and/or automatically activated ON/OFF switch for a phone and/or data line connected through the switch box. A user can disconnect his computer from the Internet to eliminate hacking when the computer is not in use. A simple push/pull lever moves any available type of male/female plug from a connect to a disconnect mode. A multi-wire version is shown. A future advanced electronic filter is shown which automatically replaces confidential data like a social security number with a set of dummy data while browsing on the Internet.

27 Claims, 8 Drawing Sheets

DATA LINE SWITCH

FIELD OF INVENTION

The present invention relates to a switch to manually and/or automatically disconnect any type of data line (coaxial, dial up, DSL, fiber optics, ethernet), from a data communications device and/or a computer primarily for security reasons.

BACKGROUND OF THE INVENTION

From its infancy to the present, the Internet has exploded into being an integral part of a consumer's daily life. As usage and access to the Internet increases so will the demand for easier and faster Internet capabilities. Internet services providing access to the Internet through technologies such as CABLE and DSL modems are a clear choice to meet this demand. Unfortunately, these technologies generate a security risk to the user. In order to provide easy access, speedy web browsing and downloading, CABLE and DSL services operate as an "always ON" system. The threat of potential intrusion from outside sources will be high. Sensitive data including social security number, credit card numbers and expiration dates, even bank account data is sitting live and vulnerable and waiting to be tapped by unauthorized outside intruders.

Therefore, it is the objective of the present invention to provide the capability to protect private/personal data by conveniently connecting to the Internet when in use and to conveniently disconnect from the Internet when not in use.

The above objectives are met by the mechanism of the present invention which provides a user the convenient, easy, and effective method of connecting and disconnecting from the Internet network. Additionally, this invention provides security to a computer that is on but not being monitored or used. Furthermore, this invention will further provide the capability to browse the Internet without any identifiable trace to the user.

The basic system disclosed herein physically disconnects a data line from a computer modem. Listed below are other electrical wire switches.

Horn '786 teaches a mechanical key which turns in a box, wherein the box contains two ends of a cable. Turning the key ON connects the four (or more) conductors. Turning the key OFF disconnects all the conductors. A collar prevents bypassing the lock so that parents can lock out a child from access to the Internet. There is no suggestion of a switch to handle coaxial and other cabling with a simple security type of on/off switch nor a phone line switch without a key.

Flowers '543 discloses a lock switch on a phone jack. The device has a rotatable lock with a contact arm to disconnect a standard phone line with a key. The purpose is to prevent phone calls on the line while the device is locked. No suggestion exists to provide a coaxial switch nor a phone line switch without a key.

The present invention offers a simple push/pull lever to disconnect any type of data line from a computer, without a key, to prevent hacking into the computer. A second embodiment provides an electronic filter to sanitize outgoing data for the Internet user who is browsing, so that sensitive data such as a social security number is not needlessly sent all over the world while a user browses.

SUMMARY OF THE INVENTION

The main aspect of the present invention is to provide a simple switch which an Internet user can switch ON/OFF with any type of data line connection.

Another aspect of the present invention is to provide an electrical/mechanical relay version of the switch.

Another aspect of the present invention is to provide a monitoring system having an electronic filter for outgoing data, thereby sanitizing confidential data while browsing on the Internet. Thus, the user must specifically authorize the release of confidential data such as to perform a purchase.

The manual connect/disconnect process can be upgraded and replaced with an electrical automatic or manual method. Using developed software application tools and integrating them into the computer (desktop), the user will have the capability to configure the mode of operation for this invention through a "pop up window". The user will have the capability to easily configure the invention to operate under an "AUTO" or "Manual" mode condition. In "AUTO" mode, connection to the Internet will be automatic as soon as any "key" on the keyboard is pressed. Additionally, the user can program the device to automatically disconnect from the Internet if selected time intervals without network activity has passed (seconds, minutes, hours).

Other aspects of this invention will appear from the following description and appended claims, reference being made to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
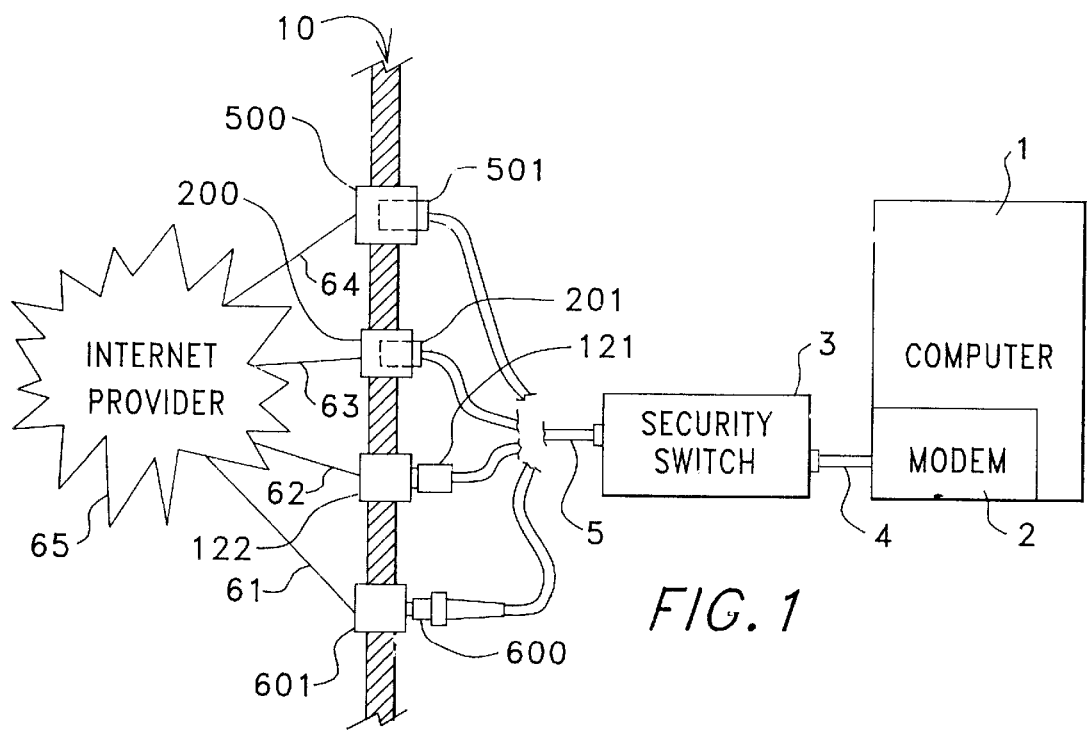
FIG. 1 is a schematic view of the security switch showing the wide range of computer communication types the device can handle.

Referring first to FIG. 1 a computer 1 has a modem 2. The modem 2 is connected to the security switch 3 via wire 4. The wire 5 can be any type of data medium connection to be compatible with a plug including a coaxial cable male plug 121, a regular phone or DSL male plug 201, a fiber optic male plug 600, or an ethernet male plug 501. The female plugs are labeled 122, 200, 601, 500, and are located in a wall 10. The Internet provider 65 is connected to the wall mounted plug via an appropriate wire 61, 62, 63, 64.

Whatever the connection the user has chosen, the security switch 3 can be adapted to handle the plugs in order to disconnect the modem 2 from the wall plug. Normally only one wall plug connection is chosen by a user. However, multiple connections are possible. The embodiment of FIG. 17 can handle any number of multiple wall plugs.

Figure 2A:
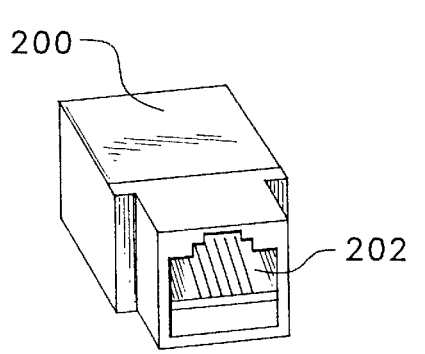
FIG. 2A (prior art) is a front perspective view of a female phone line or DSL plug.
Figure 2B:
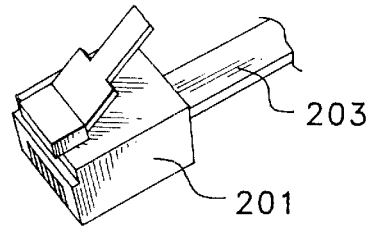
FIG. 2B (prior art) is a top perspective view of the male plug for the FIG. 2A plug.

Referring next to FIG. 2A a female phone jack 200 is shown. There are usually 6 wires 202 handled within the phone jack 200. The male phone jack 201 is shown in FIG. 2B. The wire 203 can be a regular phone line or a DSL line.

Figure 3:
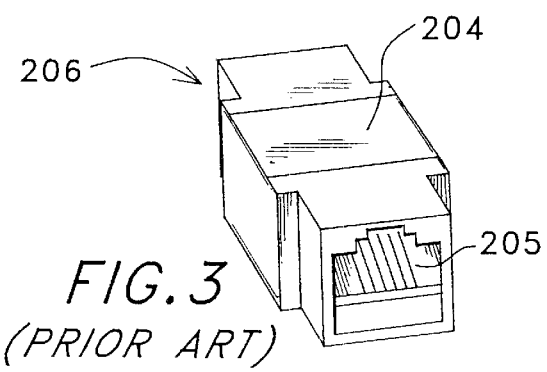
FIG. 3 (prior art) is a front perspective view of a double female plug for the phone line of FIG. 1.

FIG. 3 shows a double female plug 204. Plug 204 has female cavities 205, 206.

Figure 4:
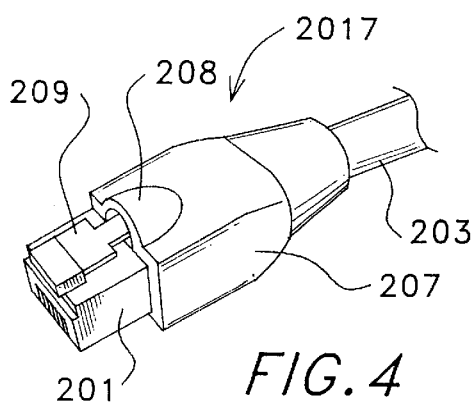
FIG. 4 is a top perspective view of the FIG. 2B plug with a quick release boot.

FIG. 4 shows the male plug 201 outfitted with a quick release boot 207, the combination labeled 2017. The boot 207 has a pocket 208 which holds down the release tab 209 permanently in the release position.

Figure 5A:
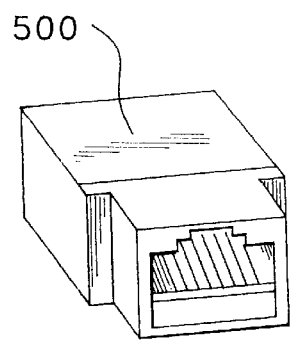
FIG. 5A is a front perspective view of an ethernet female plug.
Figure 5B:
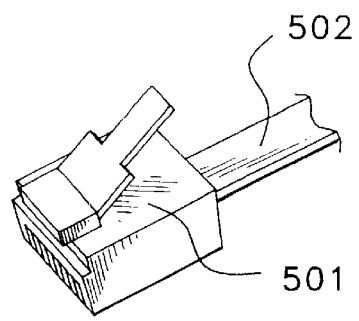
FIG. 5B is a top perspective view of an ethernet male plug.

Referring next to FIGS. 5A, 5B an ethernet line 502 has a male plug 501 and a female plug 500. These standard plugs can be substituted in the FIG. 8 and/or FIG. 17 and/or FIG. 20 embodiments.

Figure 6A:
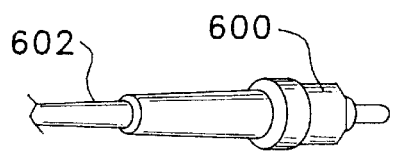
FIG. 6A is a side perspective view of a fiber optic male plug.
Figure 6B:
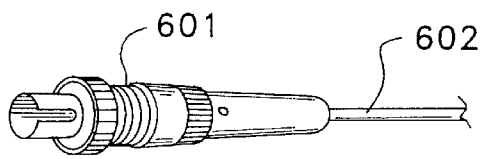
FIG. 6B is a side perspective view of a fiber optic female plug.

Referring next to FIGS. 6A, 6B a fiber optic line 602 has a male plug 600 and a female plug 601. These standard plugs can be substituted in the FIG. 8 and/or FIGS. 17, 20 embodiments also. Thus, any data medium and plug type can be handled by the present invention switch box.

Figure 7:
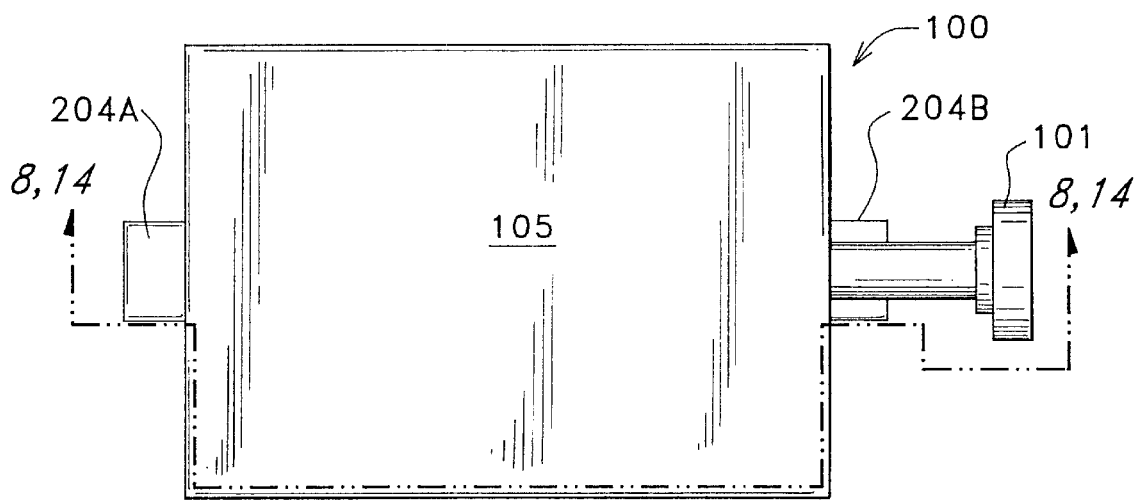
FIG. 7 is a top plan view of the preferred embodiment security switch.
Figure 8:
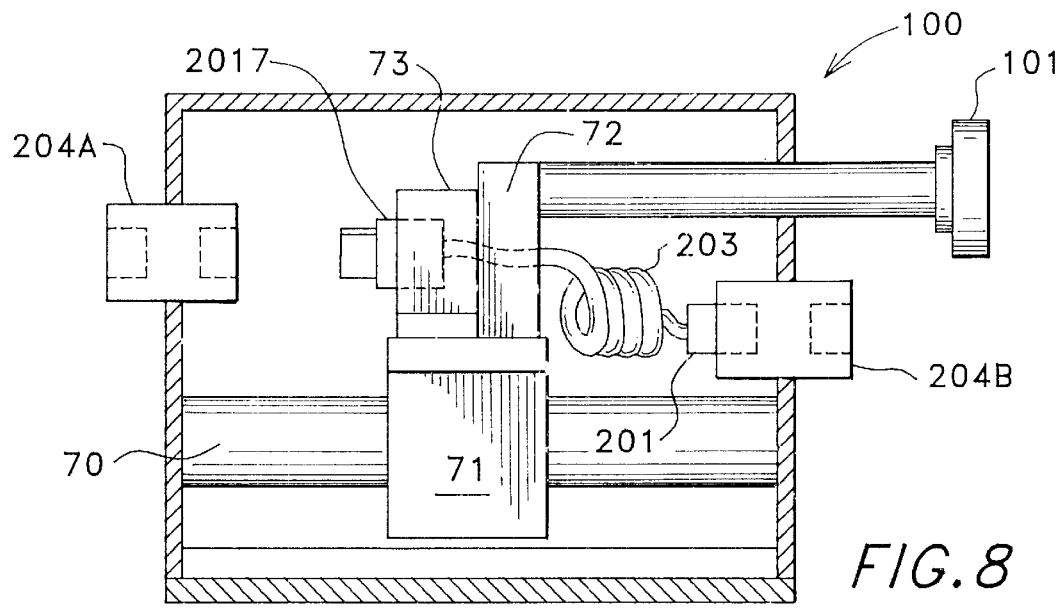
FIG. 8 is a longitudinal cross sectional view taken along line 8—8 of FIG. 7
Figure 9:
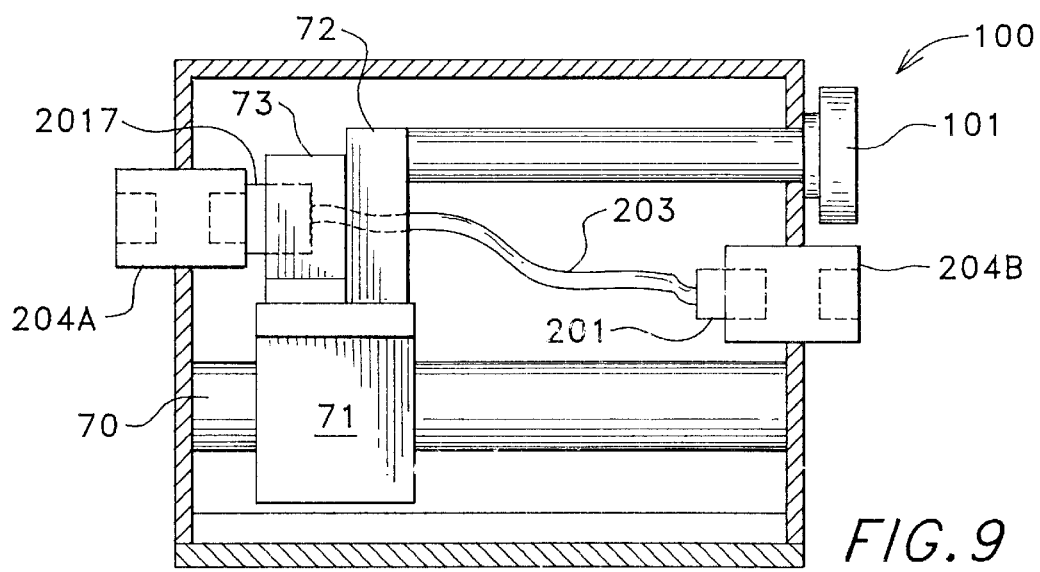
FIG. 9 is the same view as FIG. 8 with the switch closed.

FIG. 7 is a top plan view of the preferred embodiment, switch box 100. An enclosure 105 supports a first double female plug 204A and a second identical double female plug 204B at opposite ends of the enclosure 105. FIGS. 8, 9 show a push/pull mechanism 101 connecting and disconnecting the combo plug 2017 from the double female plug 204A. The phone line 203 is permanently plugged into double female plug 204B via male plug 201.

A rail 70 is permanently mounted inside the enclosure 105. A shoe 71 slides along the rail 70. The push/pull switch 101 connects to the shoe 71 via transition member 72. A plug retainer 73 also is connected to the shoe 71.

Figure 10:
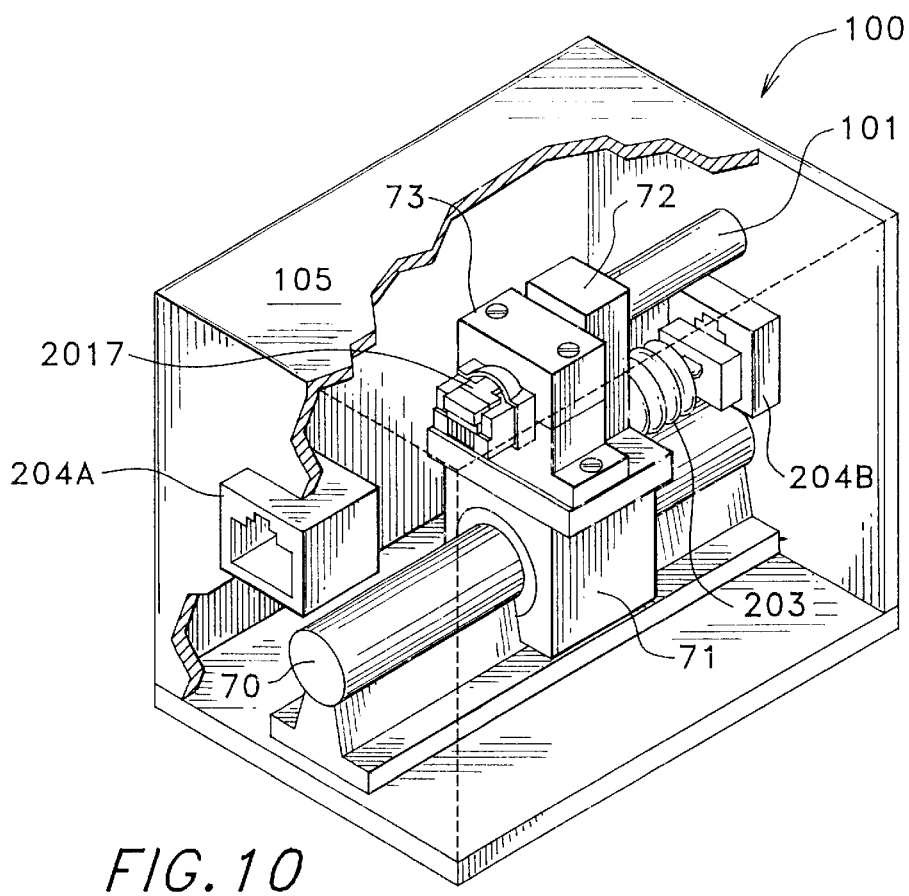
FIG. 10 is a partial cutaway view of the preferred embodiment shown in FIG. 8

Using standard plugs and simple parts and not requiring a locking key, a user can reliably disconnect his computer from a data line at will as shown in FIG. 8. He can easily re-connect his data line as shown in FIG. 9. FIG. 10 shows how simple plastic parts can be screwed and/or glued together to house the standard phone plugs.

Figure 11:
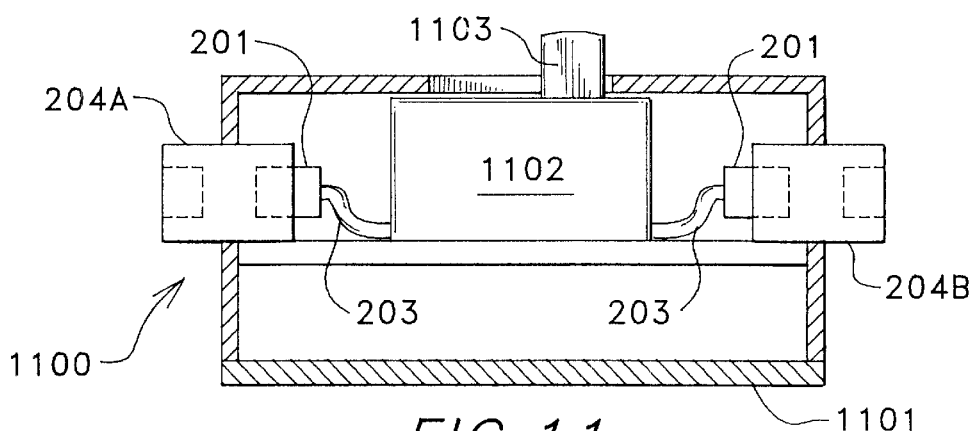
FIG. 11 is a longitudinal sectional view of an alternate embodiment using a relay switch.

Referring next to FIG. 11 an alternate embodiment 1100 switch box is shown in cross sectional view. The switch box 1100 functions the same as switch box 100. Here the wire 203 with any number of leads (normally 6) terminates inside a data transfer relay 1102 (nominally a C & K Components, Inc., part number S1010315503Q). The prior art data transfer relay 1102 has 6 or more individual switches which simultaneously connect and disconnect by activation of the slider switch 1103.

Figure 12A:
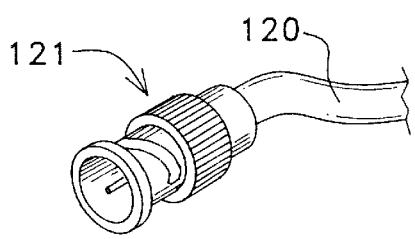
FIG. 12A (prior art) is a top perspective view of a coaxial cable with a male B & C connector.
Figure 12B:
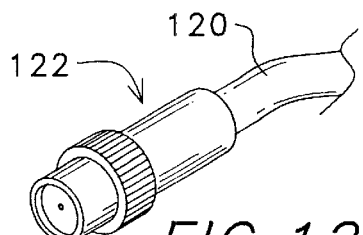
FIG. 12B (prior art) is a top perspective view of the female B & C type connector for the FIG. 12A connector.

Referring next to FIG. 12A a standard coaxial cable (RG6) labeled 120 is connected to a standard male coaxial plug 121. FIG. 12B shows the matching female plug 122.

Figure 13:
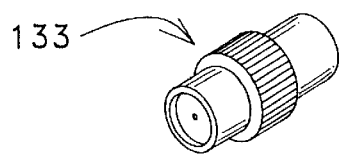
FIG. 13 (prior art) is a top perspective view of a coaxial cable female/female bulkhead connector.

FIG. 13 shows a double female bulkhead connector plug 133.

Figure 14:
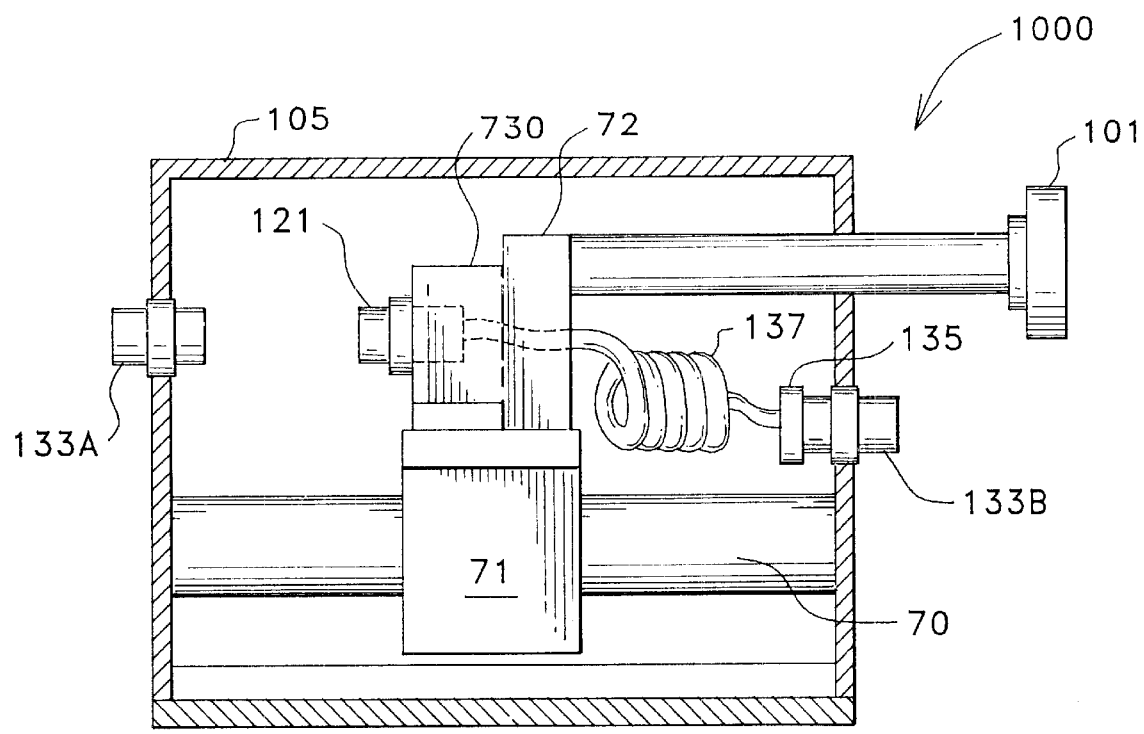
FIG. 14 is a longitudinal sectional view of the FIG. 10 switch connected to the female bulkhead coaxial connector.
Figure 15:
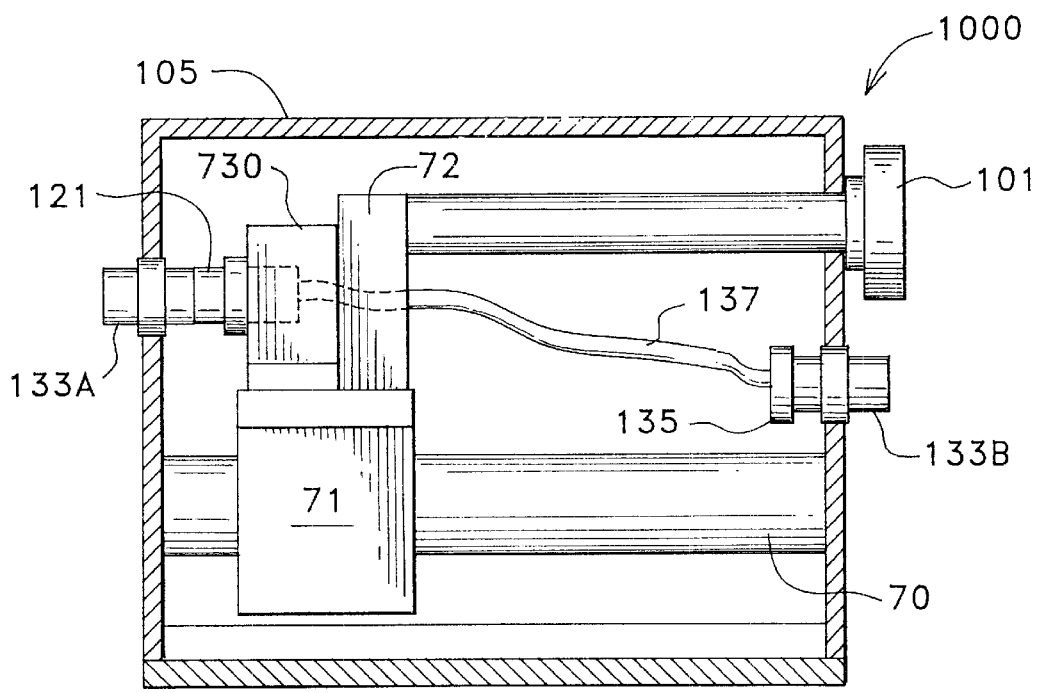
FIG. 15 is the same view as FIG. 14 with the switch in the closed position.
Figure 16:
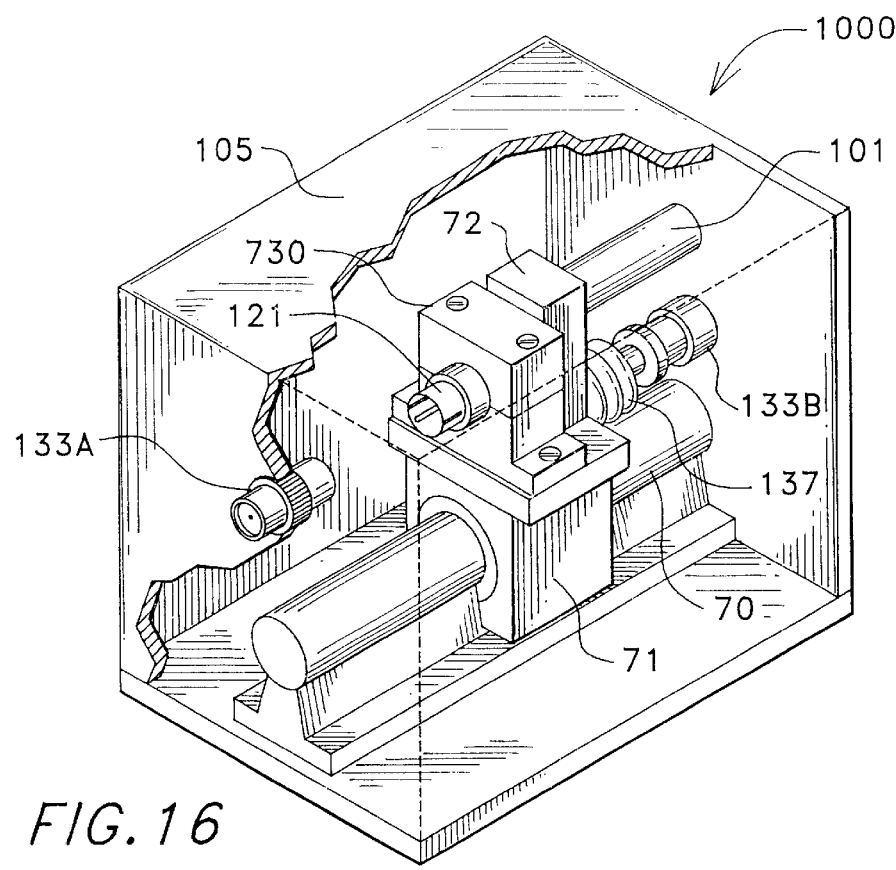
FIG. 16 is a top perspective partial cutaway view of the FIG. 14 device.

Referring next to FIGS. 14, 15, 16 the standard coaxial cable 137, and standard plugs 133A, 133B function the same as like parts from FIGS. 8, 9, 10. Switch box 1000 functions the same as switch box 100. The slight hardware change from the FIGS. 8, 9 embodiment is a changed plug retainer 730. Not shown is an equivalent switch box holding the plugs shown in FIGS. 12A, 12B.

Figure 17:
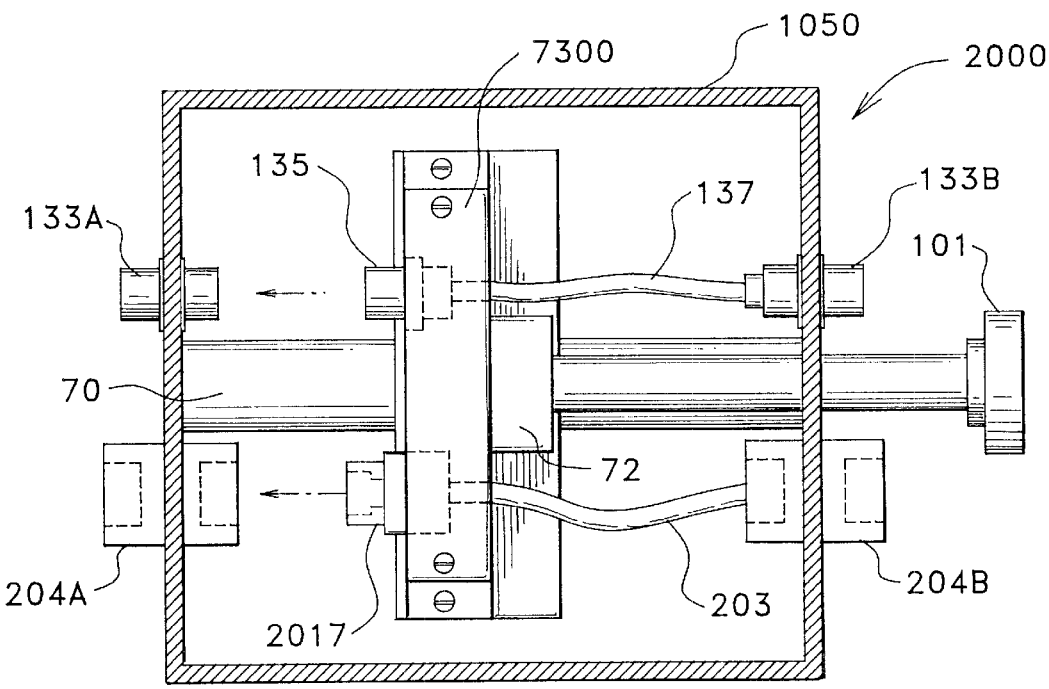
FIG. 17 is a longitudinal sectional view of an alternate embodiment having a two data circuit connect/disconnect capability.

Referring next to FIG. 17 an alternate embodiment switch box 2000 handles two data lines simultaneously. More than two data lines are easily handled by expanding the plug retainer 7300 and adding double female plugs to the housing 1050.

The switch box 2000 uses the same push/pull handle 101 to open/close two data lines, the line 137 and the line 203.

Figure 18:
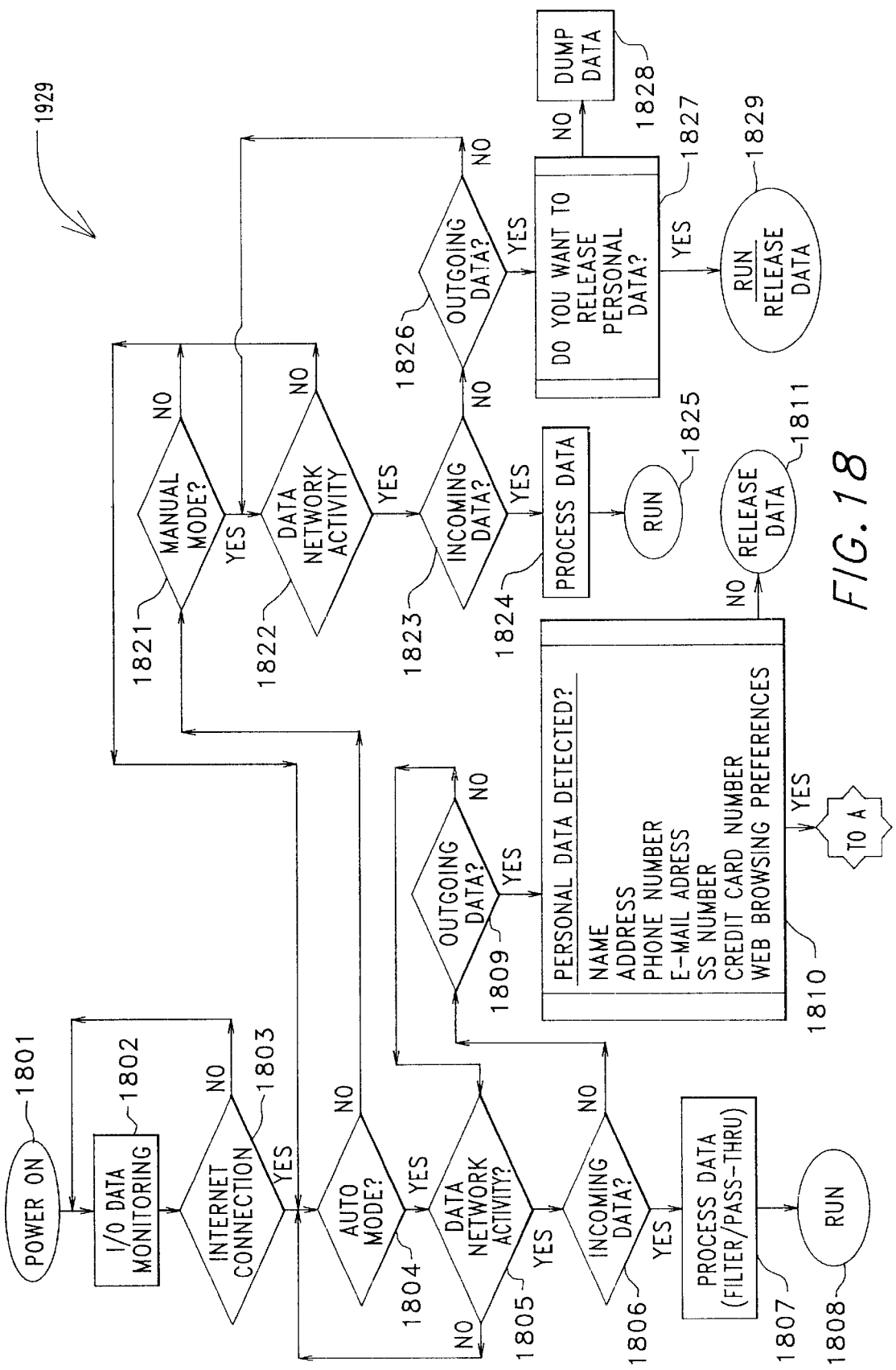
FIGS. 18 and 19 are a flow chart of the logic behind an alternate embodiment electronic output data monitoring and filtering system.
Figure 19:
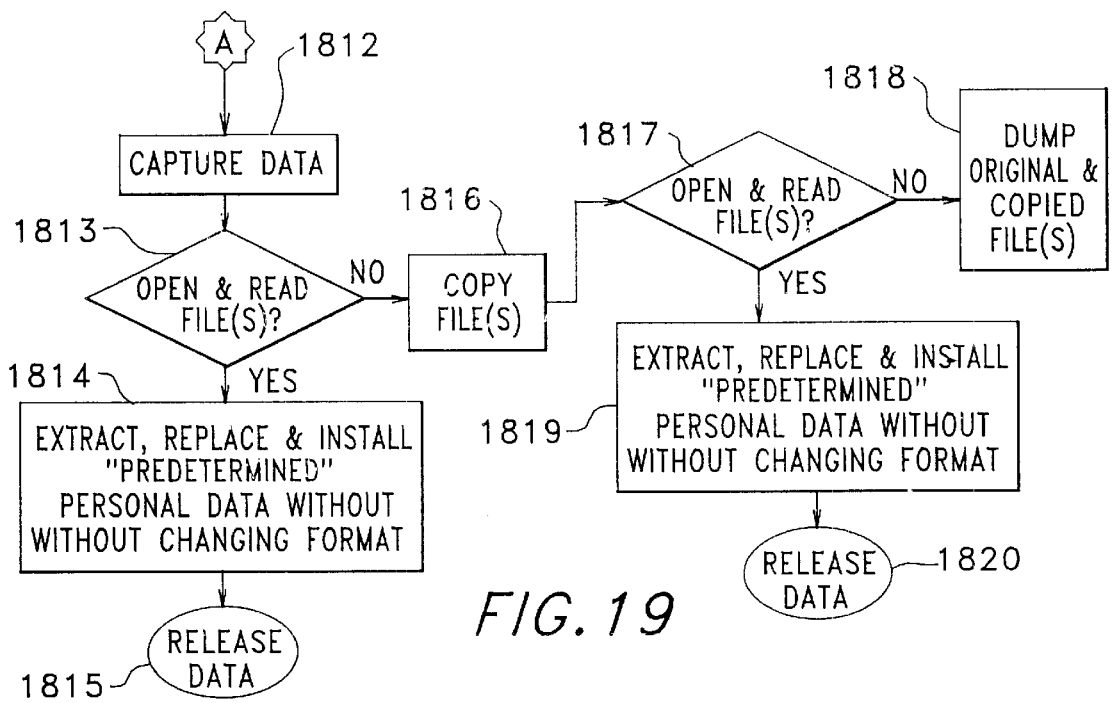

Referring next to FIGS. 18, 19 a logic flow chart for an advanced alternate embodiment is shown, wherein the system is labeled 1929. System 1929 may either replace a switch box or work in conjunction with a switch box.

System 1929 may exist as a modem logic extension and/or within an I/O card in the computer 1 and/or in software/firmware in the computer 1, and/or in the security switch 3 of FIG. 1.

The functionality of system 1929 provides the user the capability to protect their privacy when utilizing the Internet for web browsing and downloading. The intent for this invention is to monitor all incoming data and "filter" out selected outgoing personal data. All outgoing data with personal data will be captured and sanitized. An unauthorized intruder or a service receiving the data will be provided with pre-determined data (called dummy data) with correct format but will be useless for the intruder.

The numbered logic blocks function as follows:
1. Power up (start).
2. Constant I/O network data monitoring.
3. Connected to Internet?
   3a. Answer NO . . . go to 2
   3b. Answer YES . . . go to 4
4. Is computer configure to "auto" mode?
   4a. Answer NO . . . go to 21
   4b. Answer YES . . . go to 5
5. Is there any I/O network data activity?
   5a. Answer NO . . . go to 4

5b. Answer YES . . . go to 6
6. Is data incoming?
   6a. Answer NO . . . go to 9
   6b. Answer YES . . . go to 7
7. Process data accordingly and go to 8.
8. Run.
9. Is data outgoing?
   9a. Answer NO . . . go to 5
   9b. Answer YES . . . go to 10
10. Is there any file(s) with personal data detected?
   10a. Answer NO . . . go to 11
   10b. Answer YES . . . go to 12
11. Release file(s).
12. Capture data and go to 13.
13. Open and read file(s).
   13a. Answer NO . . . go to 16
   13b. Answer YES . . . go to 14
14. Extract, replace, and install "predetermine" data without changing data packet format. Go to 15.
15. Release data.
16. Copy file(s) . . . go to 17.
17. Open and read file(s).
   17a. Answer NO . . . go to 18
   17b. Answer YES . . . go to 19
18. Dump original and copied file(s).
19. Extract, replace and install "predetermine" data without changing data packet format. Go to 20.
20. Release data.
21. Is computer configure to "manual" mode?
   21a. Answer NO . . . go to 4
   21b. Answer YES . . . go to 22
22. Is there any I/O network data activity?
   22a. Answer NO . . . go to 4
   22b. Answer YES . . . go to 23
23. Is data incoming?
   23a. Answer NO . . . go to 26
   24b. Answer YES go to 24
24. Process data accordingly and go to 25.
25. Run.
26. Is data outgoing?
   26a. Answer NO . . . go to 22
   26b. Answer YES . . . go to 27
27. Do you want to release personal data?
   27a. Answer NO . . . go to 28
   28b. Answer YES . . . go to 29
28. Dump data
29. Run and release data.

Figure 20:
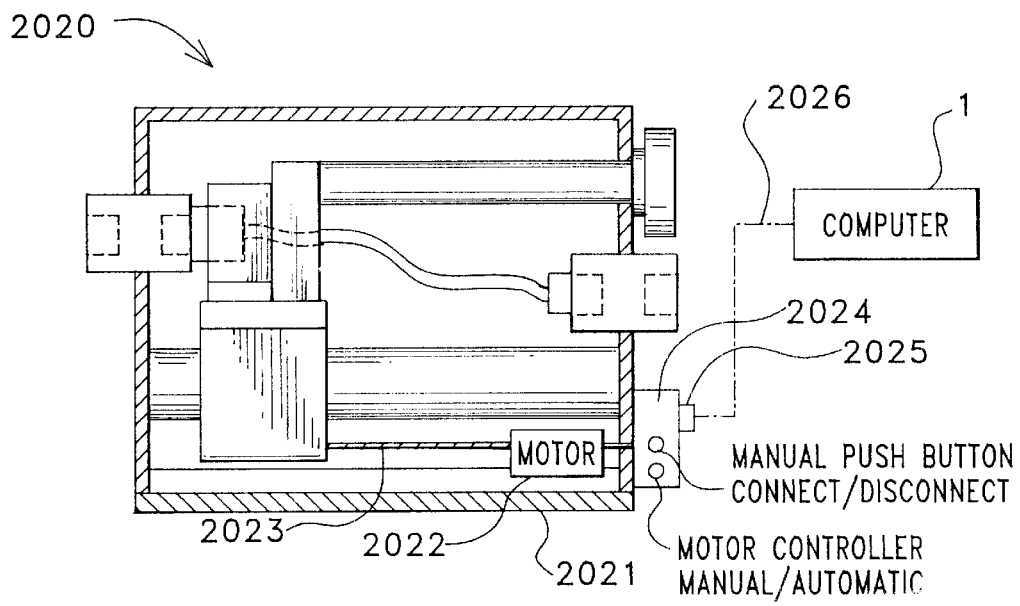
FIG. 20 is a sectional view of an alternate embodiment electro mechanical switch.

Referring next to FIG. 20 an alternate embodiment security switch 2020 has replaced the manual push/pull switch 101 with an electro mechanical assembly 2021. Assembly 2021 comprises a linear motor 2022 (or a solenoid and the like), a linkage 2023, and a motor controller 2024. The motor controller 2024 may have a manual button 2025 to allow the user to activate the motor controller 2024 with the touch of a button.

Additionally or in place of the button 2025 a control interface (wire, infra red, radio signal and the like) 2026 connects the computer 1 to the motor controller 2024.

The computer may contain a graphical user interface (GUI) to allow the user to configure his choices of how to switch the motor controller 2024 ON/OFF, and/or AUTO/Manual operation. An example could be to type a code word like "disconnect" to turn the switch OFF.

The GUI could also configure and control the system 1929's operational modes.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A data line switch comprising:
   a data medium capable of carrying electronic information between a computer and a device;
   a switch device operably coupled with the data medium;
   wherein said switch device further comprises a connected and a disconnected mode;
   said disconnected mode further comprising a physical retraction of an industry standard first connector from an industry standard second connector;
   said connected mode further comprising a physical connection between the first and the second industry standard connectors;
   a manually activated handle connected to a sliding bracket which holds the first connector; and
   wherein the switch further comprises a housing which holds the second connector as well as an outlet connector.

2. The switch of claim 1, wherein the sliding bracket is mounted on the track.

3. The switch of claim 2, wherein the handle is mounted parallel to the track.

4. The switch of claim 3, wherein the outlet connector and the second connector each are double female bulkhead connectors, and a wire is connected between the first connector and the outlet connector.

5. The switch of claim 4, wherein all the connectors are phone line connectors.

6. The switch of claim 4, wherein all the connectors are coaxial connectors.

7. The switch of claim 4, further comprising a second set of double bullhead connectors in the housing, and a second "first connector" attached to the sliding bracket, providing a second connection through the housing.

8. The switch of claim 1 further comprising monitoring means for continuously monitoring all incoming and outgoing data.

9. The switch of claim 1 further comprising data processing means for all incoming and outgoing data, the data processing means accepting, rejecting, and filtering all incoming and outgoing data.

10. A data line switch comprising:
   a data medium capable of carrying electronic information between a computer and a device;
   a switch device operably coupled with the data medium;
   wherein said switch device further comprises a connected and a disconnected mode;
   said disconnected mode further comprising a relay having multiple wire switches having an open mode;
   said connected mode further comprising closed mode for the switches; and
   a slide switch to control the modes.

11. The data line switch of claim 10 further comprising monitoring means for continuously monitoring all incoming and outgoing data.

12. The data line switch of claim 10 further comprising data processing means for all incoming and outgoing data, the data processing means accepting, rejecting, and filtering all incoming and outgoing data.

13. A data line switch comprising:
- a data medium capable of carrying electronic information between a computer and a device;
- a switch device operably coupled with the data medium;
- wherein said switch device further comprises a connected and a disconnected mode;
- said disconnected mode further comprising a physical retraction of an industry standard first connector from an industry standard second connector;
- said connected mode further comprising a physical connection between the first and the second industry standard connectors;
- wherein the switch further comprises a powered actuator connected to a sliding bracket which holds the first connector; and
- a housing holding the second connector as well as an outlet connector.

14. The switch of claim 13 further comprising a push button activated controller to move the actuator from an off position to an on position and from an on position to an off position.

15. The switch of claim 13 further comprising a control link from the computer to the actuator to enable a computer controlled activation of the actuator.

16. The switch of claim 15 further comprising a push button activated controller for the actuator.

17. The switch of claim 13 further comprising monitoring means for continuously monitoring all incoming and outgoing data.

18. The switch of claim 13 further comprising data processing means for all incoming and outgoing data, the data processing means accepting, rejecting, and filtering all incoming and outgoing data.

19. A data line switch comprising:
- a data medium capable of carrying electronic information between a computer and a device;
- a switch device operably coupled with the data medium;
- wherein said switch device further comprises a connected and a disconnected mode;
- said disconnected mode further comprising a physical retraction of a first connector from a second connector;
- said connected mode further comprising a physical connection between the first and the second connectors;
- wherein the switch further comprises a manually activated handle connected to a bracket which holds the first connector; and
- wherein the switch further comprises a housing which holds the second connector as well as an outlet connector.

20. The switch of claim 19, wherein the bracket is mounted on a track.

21. The switch of claim 20, wherein the handle is a slidably mounted parallel to the track.

22. The switch of claim 19, wherein each of the first and second connectors is an industry standard type.

23. The switch of claim 19 further comprising monitoring means for continuously monitoring all incoming and outgoing data.

24. The switch of claim 19 further comprising data processing means for all incoming and outgoing data, the data processing means accepting, rejecting, and filtering all incoming and outgoing data.

25. A data line switch comprising:
- a data medium capable of carrying electronic information between a computer and a device;
- a switch device electronically operably coupled with the data medium, the switch device having an electronic control connected mode and an electronic control disconnected mode;
- said disconnected mode comprising an electronic retraction of a first connector from a second connector;
- said connected mode further comprising an electronic connection between the first and the second connectors;
- wherein the switch device further comprises a housing which holds all data processing and controlling electrical circuitry, the second connector, and an outlet connector.

26. The data line switch of claim 25 and further comprising:
- monitoring means for continuously monitoring all incoming and outgoing data.

27. The data line switch of claim 25 further comprising:
- data processing means for all incoming and outgoing data, the data processing means accepting, rejecting, and filtering all incoming and outgoing data.

* * * * *